(12) United States Patent
Kim

(10) Patent No.: US 10,948,995 B2
(45) Date of Patent: Mar. 16, 2021

(54) METHOD AND SYSTEM FOR SUPPORTING OBJECT CONTROL, AND NON-TRANSITORY COMPUTER-READABLE RECORDING MEDIUM

(71) Applicant: VTouch Co., Ltd., Seoul (KR)

(72) Inventor: Seok Joong Kim, Seoul (KR)

(73) Assignee: VTOUCH CO., LTD., Seoul (KR)

( * ) Notice: Subject to any disclaimer, the term of this patent is extended or adjusted under 35 U.S.C. 154(b) by 22 days.

(21) Appl. No.: 16/391,721

(22) Filed: Apr. 23, 2019

(65) Prior Publication Data
US 2019/0250716 A1    Aug. 15, 2019

Related U.S. Application Data

(63) Continuation of application No. PCT/KR2017/011788, filed on Oct. 24, 2017.

(30) Foreign Application Priority Data

Oct. 24, 2016    (KR) .................. 10-2016-0138662

(51) Int. Cl.
*G06F 3/01* (2006.01)
*G05B 19/409* (2006.01)
(Continued)

(52) U.S. Cl.
CPC ........... *G06F 3/017* (2013.01); *G05B 19/409* (2013.01); *G06F 3/01* (2013.01); *G06F 3/0484* (2013.01);
(Continued)

(58) Field of Classification Search
CPC .......... G06F 3/017; G06F 3/01; G06F 3/0484; G06F 3/013; G06F 3/04842; G06T 7/269;
(Continued)

(56) References Cited

U.S. PATENT DOCUMENTS

| | | | |
|---|---|---|---|
| 8,253,746 B2* | 8/2012 | Geisner | A63F 13/428 345/474 |
| 8,824,802 B2* | 9/2014 | Kutliroff | G06K 9/00335 382/190 |

(Continued)

FOREIGN PATENT DOCUMENTS

| | | |
|---|---|---|
| EP | 3059664 A1 | 8/2016 |
| JP | 2006268209 A | 10/2006 |

(Continued)

OTHER PUBLICATIONS

International Search Report for PCT/KR2017/011788 dated Feb. 2, 2018.

*Primary Examiner* — Ramesh B Patel
(74) *Attorney, Agent, or Firm* — Dinsmore & Shohl LLP; Yongsok Choi, Esq.

(57) ABSTRACT

According to one aspect of the invention, there is provided a method for assisting object control, comprising the steps of: specifying, in a real-world coordinate system, a control vector corresponding to a gesture or manipulation performed by a user; determining an object indicated by the control vector as a target object to be controlled by the gesture or manipulation performed by the user; performing mapping for specifying a control coordinate point corresponding to a magnitude or direction of the control vector in a target object reference coordinate system defined on the basis of a characteristic of the target object; and determining a control command to be applied to the target object, with reference to the control coordinate point specified by the mapping.

7 Claims, 5 Drawing Sheets

(51) Int. Cl.
*G06F 3/0484* (2013.01)
*G06T 7/269* (2017.01)

(52) U.S. Cl.
CPC .... *G06T 7/269* (2017.01); *G05B 2219/35444* (2013.01)

(58) Field of Classification Search
CPC ........ G06T 2207/30241; G05B 19/409; G05B 2219/35444
See application file for complete search history.

(56) References Cited

U.S. PATENT DOCUMENTS

| | | | | |
|---|---|---|---|---|
| 9,477,303 | B2* | 10/2016 | Fleischmann | G06T 17/00 |
| 9,513,711 | B2* | 12/2016 | Ryu | G06F 3/017 |
| 9,910,498 | B2* | 3/2018 | Kutliroff | G06F 3/017 |
| 10,013,808 | B2* | 7/2018 | Jones | G06T 19/20 |
| 10,234,954 | B2* | 3/2019 | Kim | G06F 3/017 |
| 10,299,032 | B2* | 5/2019 | Grazian | H04R 1/2811 |
| 10,642,372 | B2* | 5/2020 | Kim | G06F 3/017 |
| 2013/0321347 | A1* | 12/2013 | Kim | G06F 3/042 |
| | | | | 345/175 |
| 2014/0184499 | A1 | 7/2014 | Kim | |
| 2015/0116204 | A1* | 4/2015 | Kim | G06F 3/017 |
| | | | | 345/156 |
| 2015/0135144 | A1* | 5/2015 | Kim | G06F 3/04815 |
| | | | | 715/850 |
| 2015/0145830 | A1* | 5/2015 | Kim | G06F 3/04815 |
| | | | | 345/175 |
| 2016/0026253 | A1* | 1/2016 | Bradski | H04N 13/344 |
| | | | | 345/8 |
| 2016/0170603 | A1 | 6/2016 | Bastien et al. | |
| 2017/0075427 | A1* | 3/2017 | Kim | G06F 3/013 |
| 2018/0173318 | A1* | 6/2018 | Kim | G06K 9/00355 |
| 2019/0019515 | A1* | 1/2019 | Kim | G06F 3/011 |
| 2019/0094981 | A1* | 3/2019 | Bradski | G02B 27/0093 |
| 2019/0163268 | A1* | 5/2019 | Shin | H04N 13/344 |
| 2019/0163284 | A1* | 5/2019 | Kim | G06T 7/74 |
| 2019/0265802 | A1* | 8/2019 | Parshionikar | G06F 3/012 |

FOREIGN PATENT DOCUMENTS

| | | |
|---|---|---|
| JP | 2007266772 A | 10/2007 |
| KR | 1020060070280 A | 6/2006 |
| KR | 1020100129629 A | 12/2010 |
| KR | 1020110117966 A | 10/2011 |
| KR | 1020140060604 A | 5/2014 |
| KR | 101630153 B1 | 6/2016 |
| WO | 2015126197 A1 | 8/2015 |

\* cited by examiner

METHOD AND SYSTEM FOR SUPPORTING OBJECT CONTROL, AND NON-TRANSITORY COMPUTER-READABLE RECORDING MEDIUM

CROSS-REFERENCE TO RELATED APPLICATION(S)

This application is a continuation application of Patent Cooperation Treaty (PCT) International Application Serial No. PCT/KR2017/011788, filed on Oct. 24, 2017, which claims priority to Korean Patent Application Serial No. 10-2016-0138662, filed on Oct. 24, 2016. The entire contents of PCT International Application Serial No. PCT/KR2017/011788, and Korean Patent Application Serial No. 10-2016-0138662 are hereby incorporated by reference.

FIELD OF THE INVENTION

The present invention relates to a method, system, and non-transitory computer-readable recording medium for assisting object control.

BACKGROUND

In recent years, techniques have been introduced to assist a user to control a real object such as a home appliance or a virtual object such as an avatar on the basis of a gesture.

Particularly, as interest in augmented reality (AR) or virtual reality (VR) is increasing recently and research and development in related technical fields are actively carried out, there is a growing demand for techniques to assist a user to smoothly control interactable objects existing in actual reality or virtual reality.

Conventionally, a technique has been proposed in which a user's control command is delivered only to a target object predetermined by a user or a system, and a technique has also been proposed in which a user specifies a target object with a pointer such as a mouse cursor or particularly mentions the name of the target object (e.g., "Turn off the living room light", "Lower the air conditioner temperature of Room 301", etc.) to deliver the user's control command to the target object.

However, according to the above conventional techniques, the user cannot control any object other than the predetermined object, or the user should personally specify the object to be controlled very specifically whenever controlling the object, and thus there is a limitation in that flexibility is low and user convenience is poor in actual use environment.

Particularly, it is common that various kinds of objects (e.g., home appliances, furniture, etc.) exist in an indoor space such as an office or a house, and these objects have different characteristics in sizes, functions, and the like. Thus, methods for controlling the objects need to be adaptively established according to the characteristics of the objects. For example, turning on or off a lamp may be controlled by a gesture of pushing or turning a power switch of the lamp, and opening or closing a window may be controlled by a gesture of sliding the window vertically or horizontally. However, according to the conventional techniques, the objects may be controlled only through uniform control methods in which the characteristics of the objects are not reflected, and thus there is a limitation in that it is difficult to effectively control various kinds of objects.

In this connection, the inventor(s) present a technique for allowing a user to precisely control various objects by simply performing an intuitive gesture or manipulation, by mapping a control vector, which is specified in a real-world coordinate system according to a gesture or manipulation that the user intuitively performs using his/her body part or a certain vector control means, to a control coordinate point in an object reference coordinate system defined according to a characteristic of an object.

SUMMARY OF THE INVENTION

One object of the present invention is to solve all the above-described problems.

Another object of the invention is to provide a method, system, and non-transitory computer-readable recording medium for allowing a user to precisely and conveniently control various objects by simply performing an intuitive gesture or manipulation for generating (or specifying) a control vector, by specifying, in a real-world coordinate system, a control vector corresponding to a gesture or manipulation performed by a user; determining an object indicated by the control vector as a target object to be controlled by the gesture or manipulation performed by the user; performing mapping for specifying a control coordinate point corresponding to a magnitude or direction of the control vector in a target object reference coordinate system defined on the basis of a characteristic of the target object; and determining a control command to be applied to the target object, with reference to the control coordinate point specified by the mapping.

The representative configurations of the invention to achieve the above objects are described below.

According to one aspect of the invention, there is provided a method for assisting object control, comprising the steps of: specifying, in a real-world coordinate system, a control vector corresponding to a gesture or manipulation performed by a user; determining an object indicated by the control vector as a target object to be controlled by the gesture or manipulation performed by the user; performing mapping for specifying a control coordinate point corresponding to a magnitude or direction of the control vector in a target object reference coordinate system defined on the basis of a characteristic of the target object; and determining a control command to be applied to the target object, with reference to the control coordinate point specified by the mapping.

According to another aspect of the invention, there is provided a system for assisting object control, comprising: an object control management unit configured to: specify, in a real-world coordinate system, a control vector corresponding to a gesture or manipulation performed by a user; determine an object indicated by the control vector as a target object to be controlled by the gesture or manipulation performed by the user; perform mapping for specifying a control coordinate point corresponding to a magnitude or direction of the control vector in a target object reference coordinate system defined on the basis of a characteristic of the target object; and determine a control command to be applied to the target object, with reference to the control coordinate point specified by the mapping; and a spatial information management unit configured to store spatial information on the user and the object.

In addition, there are further provided other methods and systems to implement the invention, as well as non-transitory computer-readable recording media having stored thereon computer programs for executing the methods.

According to the invention, it is possible to allow a user to precisely and conveniently control various objects by simply performing an intuitive gesture or manipulation for generating (or specifying) a control vector, by mapping a control vector, which is specified in a real-world coordinate system according to a gesture or manipulation that the user intuitively performs using his/her body part or a certain vector control means, to a control coordinate point in an object reference coordinate system defined according to a characteristic of an object.

According to the invention, it is possible to determine an object that appears to be superimposed on a fingertip of a user as seen from the viewpoint of the user as a target object, so that all objects existing in areas that the user can view may be controlled without limitations on effective areas (i.e., controllable areas).

According to the invention, it is possible to determine an object indicated by a vector control means that may be manipulated by a user as a target object, so that all objects existing in areas that the user can intuitively predict (or estimate) to be indicated by the vector control means may be controlled without limitations on effective areas (i.e., controllable areas)

According to the invention, it is possible to perform a process of determining a target object to be controlled and a process of determining a control command to be applied to the target object together, so that there is no need to separate and change any one of the target object and the control command when the target object is changed (i.e., when switching from a first object to a second object), thereby enhancing user convenience.

According to the invention, it is possible to perform a process of determining a target object to be controlled and a process of determining a control command to be applied to the target object together, thereby remarkably reducing the possibility of the object performing a certain operation not intended by a user (i.e., a false operation).

DETAILED DESCRIPTION

Figure 1:
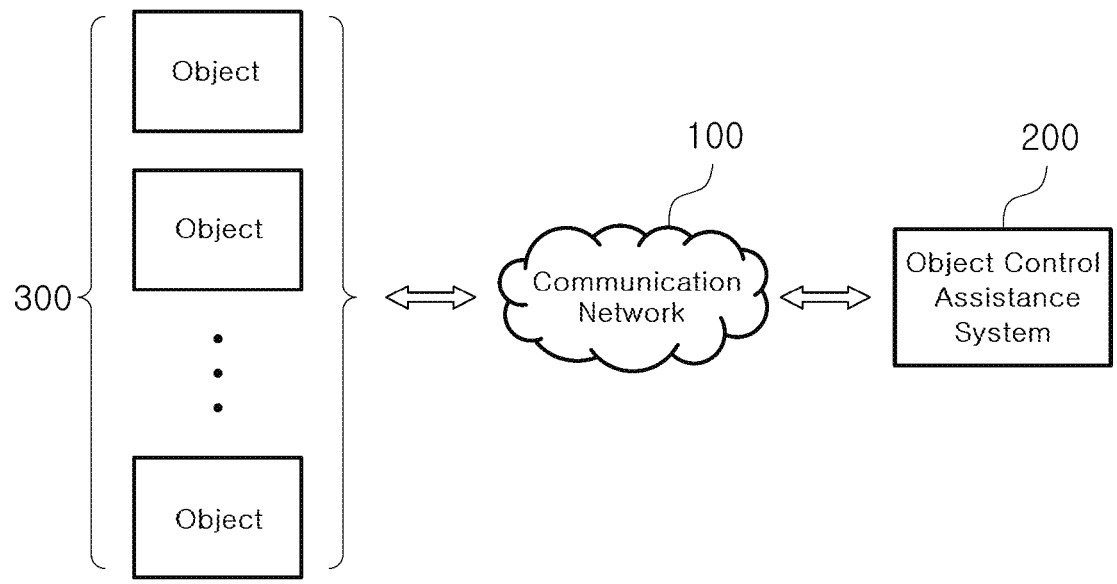
FIG. 1 illustratively shows the configuration of an entire system for assisting object control according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each of the disclosed embodiments may also be modified without departing from the spirit and scope of the invention. Therefore, the following detailed description is not to be taken in a limiting sense, and the scope of the invention, if properly described, is limited only by the appended claims together with all equivalents thereof. In the drawings, like reference numerals refer to the same or similar functions throughout the several views.

Hereinafter, preferred embodiments of the present invention will be described in detail with reference to the accompanying drawings to enable those skilled in the art to easily implement the invention.

Configuration of the Entire System

FIG. 1 illustratively shows the configuration of the entire system for assisting object control according to one embodiment of the invention.

As shown in FIG. 1, the entire system according to one embodiment of the invention may comprise a communication network 100, an object control assistance system 200, and an object 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as radio frequency (RF) communication, WiFi communication, cellular communication (e.g., Long Term Evolution (LTE) communication), Bluetooth communication (more specifically, Bluetooth Low Energy (BLE) communication), infrared communication, and ultrasonic communication. As another example, the communication network 100 may be an optical communication network, at least a part of which may be implemented with a conventional communication scheme such as Light Fidelity (LiFi).

Next, the object control assistance system 200 according to one embodiment of the invention may be a digital device having a memory means and a microprocessor for computing capabilities. The object control assistance system 200 may be a server system.

To this end, as will be described in detail below, the object control assistance system 200 may function to allow a user to precisely and conveniently control various objects by simply performing an intuitive gesture or manipulation for generating (or specifying) a control vector, by specifying, in a real-world coordinate system, a control vector corresponding to a gesture or manipulation performed by a user; determining an object indicated by the control vector as a target object to be controlled by the gesture or manipulation performed by the user; performing mapping for specifying a control coordinate point corresponding to a magnitude or direction of the control vector in a target object reference coordinate system defined on the basis of a characteristic of the target object; and determining a control command to be applied to the target object, with reference to the control coordinate point specified by the mapping. The functions of the object control assistance system 200 will be discussed in more detail below.

Meanwhile, although the object control assistance system 200 has been described as above, the above description is illustrative, and it will be apparent to those skilled in the art that at least a part of the functions or components required for the object control assistance system 200 may be implemented or included in the object 300 to be controlled (i.e., a device) or an external system (not shown), as necessary.

Next, according to one embodiment of the invention, the object 300 may function as an object that may be controlled by a gesture or manipulation of a user. That is, according to one embodiment of the invention, the object 300 may receive a control command according to the gesture or manipulation of the user from the object control assistance system 200, another object 300, or an external system (not shown), and allow its operation or function to be controlled according to the received control command. According to one embodiment of the invention, the object 300 may be a real object existing in the real world, or a virtual object that may exist in virtual reality or may be augmented, mixed, or merged to the real world.

Specifically, the object 300 according to one embodiment of the invention may be a device that may function to connect to and then communicate with the object control assistance system 200, another object 300, or an external system (not shown), and any type of device having a memory means and a microprocessor for computing capabilities may be adopted as the object 300 according to the invention. According to one embodiment of the invention, the object 300 may be a wearable device such as smart glasses, a smart watch, a smart band, a smart ring, and a smart necklace, or may be a somewhat traditional device such as a smart phone, a smart pad, a desktop computer, a notebook computer, a workstation, a personal digital assistant (PDA), a web pad, and a mobile phone. Further, according to one embodiment of the invention, the object 300 may be an IoT (Internet of Things) device such as a television, a speaker, a lamp, an air conditioner, a humidifier, a chest of drawers, a window, and a blind.

Furthermore, the object 300 according to one embodiment of the invention may be a general object having a predetermined physical position in the real world, which may not function to communicate with the object control assistance system 200, another object 300, or an external system (not shown), or may not have a memory means or a microprocessor. For example, a general object such as a thermometer, a photograph, a picture, a doll, and a mirror may be adopted as the object 300 according to one embodiment of the invention.

Meanwhile, according to one embodiment of the invention, the object 300 as a device may include an application for performing functions according to the invention. The application may reside in the device in the form of a program module. The characteristics of the program module may be generally similar to those of a spatial information management unit 210 and an object control management unit 220 of the object control assistance system 200 to be described below. Here, at least a part of the application may be replaced with a hardware device or a firmware device that may perform a substantially equal or equivalent function, as necessary.

Configuration of the Object Control Assistance System

Hereinafter, the internal configuration of the object control assistance system 200 crucial for implementing the invention and the functions of the respective components thereof will be discussed.

Figure 2:
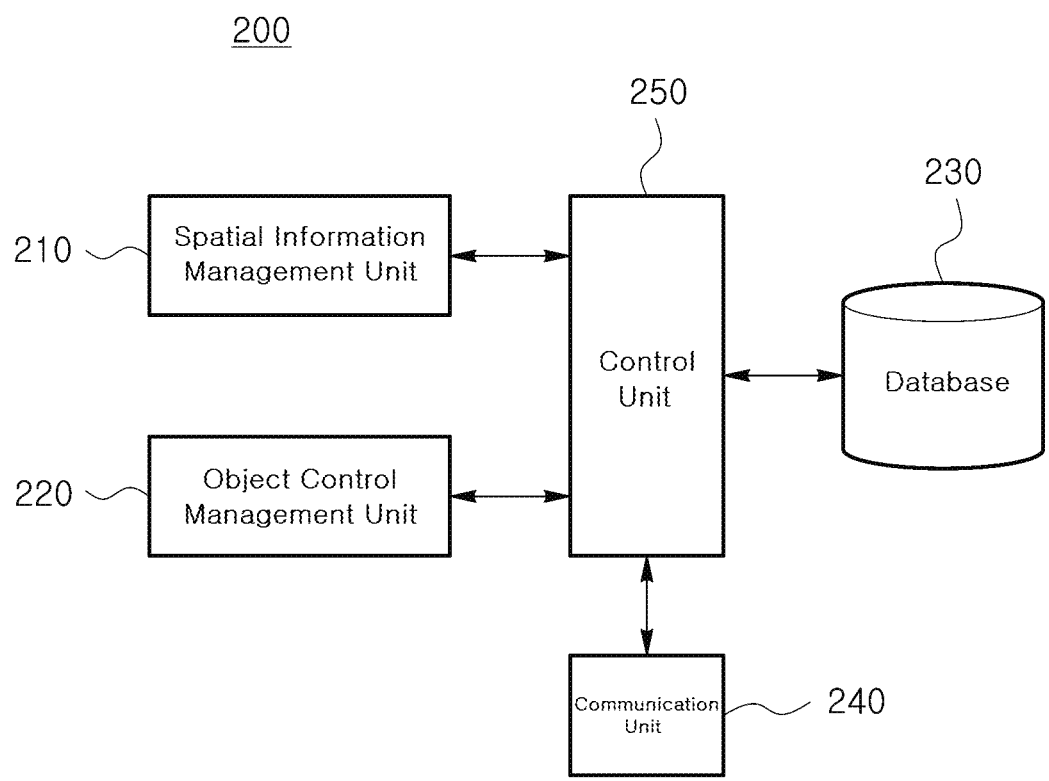
FIG. 2 illustratively shows the internal configuration of an object control assistance system according to one embodiment of the invention.

FIG. 2 illustratively shows the internal configuration of the object control assistance system according to one embodiment of the invention.

Referring to FIG. 2, the object control assistance system 200 according to one embodiment of the invention may comprise a spatial information management unit 210, an object control management unit 220, a database 230, a communication unit 240, and a control unit 250. According to one embodiment of the invention, at least some of the spatial information management unit 210, the object control management unit 220, the database 230, the communication unit 240, and the control unit 250 may be program modules to communicate with an external system (not shown). The program modules may be included in the object control assistance system 200 in the form of operating systems, application program modules, and other program modules, while they may be physically stored in a variety of commonly known storage devices. Further, the program modules may also be stored in a remote storage device that may communicate with the object control assistance system 200. Meanwhile, such program modules may include, but not limited to, routines, subroutines, programs, objects, components, data structures, and the like for performing specific tasks or executing specific abstract data types as will be described below in accordance with the invention.

Meanwhile, although the object control assistance system 200 has been described as above, the above description is illustrative, and it will be apparent to those skilled in the art that at least a part of the components or functions of the object control assistance system 200 may be implemented or included in the object 300 to be controlled (e.g., an IoT device) or an external system (not shown), as necessary. Further, in some cases, all of the functions and components of the object control assistance system 200 may be implemented or included in the object 300 or an external system (not shown).

First, according to one embodiment of the invention, the spatial information management unit 210 may function to acquire spatial information necessary for a user to control various objects existing in a surrounding space (hereinafter referred to as "target space") by performing a predetermined gesture or manipulation.

Specifically, the spatial information management unit 210 according to one embodiment of the invention may acquire information necessary for identifying at least one user and at least one object existing in the target space. For example, it is possible to acquire information on an identifier, a dominant eye, and the like of the user, and information on an identifier, a characteristic, an operating status, a communication means, and the like of the object.

Further, the spatial information management unit 210 according to one embodiment of the invention may acquire information necessary for specifying a position and posture of at least one user and at least one object existing in the target space. For example, it is possible to acquire information on a position and posture of the user (more specifically, a dominant eye of the user and a body part that the user causes to appear to be superimposed on the object) specified in a real-world coordinate system defined with respect to the target space, and information on a position and posture of the object 300 specified in the real-world coordinate system.

Meanwhile, according to one embodiment of the invention, the spatial information acquired as above may be updated in real time at predetermined time periods, or may be dynamically updated as an event such as a change in the position or posture of the user or the object 300 occurs.

Figure 3:
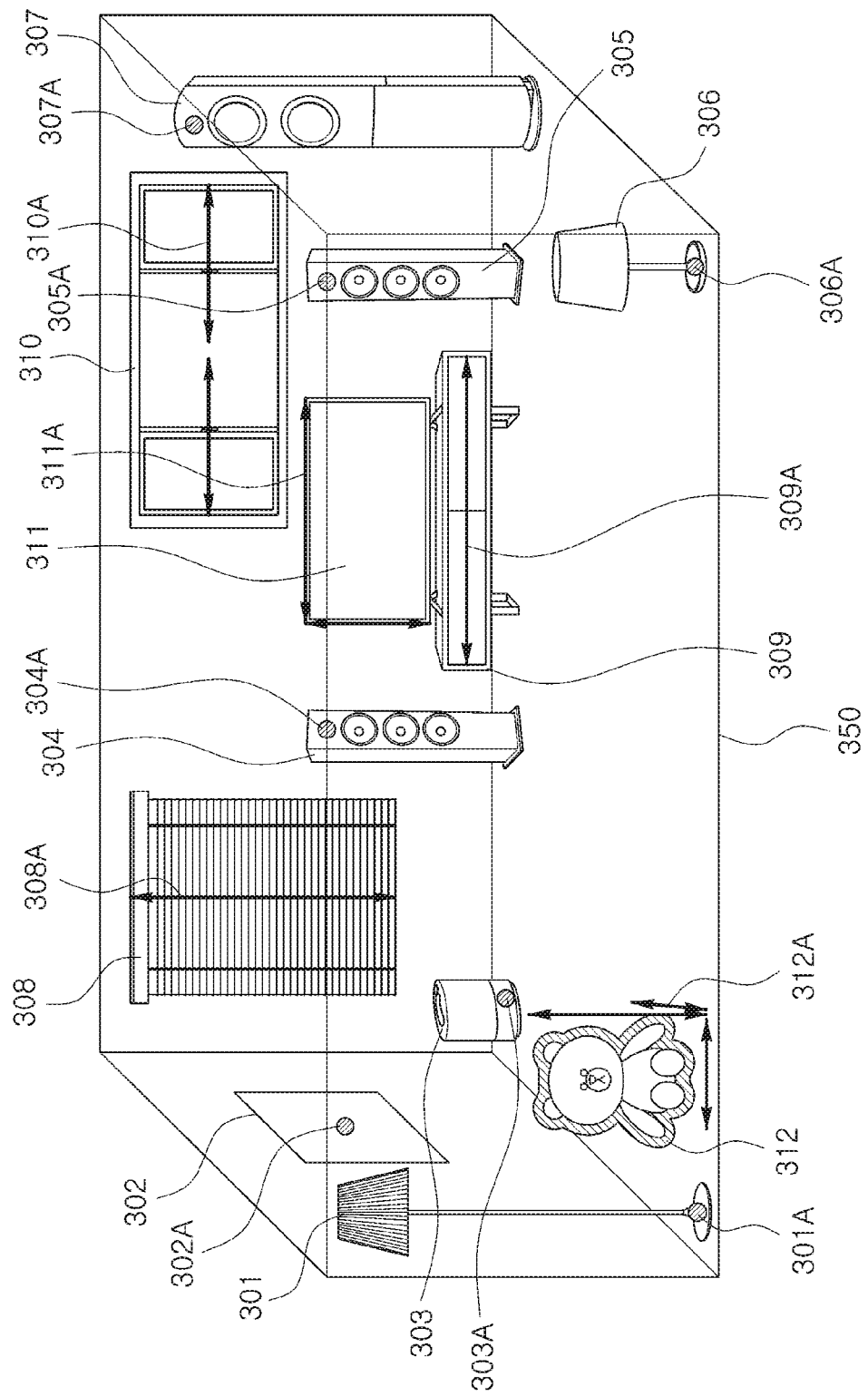
FIG. 3 illustratively shows a situation in which various controllable objects exist in a target space according to one embodiment of the invention.

FIG. 3 illustratively shows a situation in which various controllable objects exist in a target space according to one embodiment of the invention.

Referring to FIG. 3, the spatial information management unit 210 according to one embodiment of the invention may establish a zero-dimensional point, a one-dimensional line, a two-dimensional area, or a three-dimensional space with respect to which a user may perform a gesture or manipulation for specifying an object existing in a target space 350 or controlling an operation or function of the object, with reference to a characteristic of the object. For example, reference points 301A to 307A may be established for objects characterized in that a manipulation of pressing a button or turning a dial may be applied, such as lamps 301 and 306, speakers 304 and 305, a mirror 302, a humidifier 303, and an air conditioner 307; reference lines 308A to 310A may be established for objects characterized in that a manipulation of sliding vertically or horizontally may be applied, such as a blind 308, a chest of drawers 309, and a window 310; a two-dimensional reference area 311A may be established for objects characterized in that a manipulation on a two-dimensional screen may be applied, such as a television 311; and a three-dimensional reference space 312A may be established for objects characterized in that a manipulation may be applied with respect to a three-dimensional space, such as a virtual reality object 312.

Meanwhile, the spatial information management unit 210 according to one embodiment of the invention may define an object reference coordinate system with reference to a characteristic of the object. For example, for the objects characterized in that a manipulation of pressing a button or turning a dial may be applied (such as the lamps 301 and 306, the speakers 304 and 305, the mirror 302, the humidifier 303, and the air conditioner 307), a zero-dimensional object reference coordinate system whose origin is each of the reference points 301A to 307A of the objects may be defined. As another example, for the objects characterized in that a manipulation of sliding vertically or horizontally may be applied (such as the blind 308, the chest of drawers 309, and the window 310), a one-dimensional object reference coordinate system whose axis is each of the reference lines 308A to 310A of the objects may be defined. As yet another example, for the objects characterized in that a manipulation of specifying a point, a line, or an area on a two-dimensional screen may be applied (such as the television 311), a two-dimensional object reference coordinate system corresponding to the two-dimensional reference area 311A of the object may be defined. As still another example, for the objects characterized in that a manipulation may be applied with respect to a three-dimensional space (such as the virtual reality object 312), a three-dimensional object reference coordinate system corresponding to the three-dimensional reference space 312A of the object may be defined.

Next, the object control management unit 220 according to one embodiment of the invention may allow a user to specify a target object that the user desires to control, by performing an action such that a body part such as a fingertip of the user corresponds to (i.e., appears to be superimposed on) the target object that the user desires to control, as seen from the viewpoint of the user.

Further, the object control management unit 220 according to one embodiment of the invention may allow the user to control an operation or function of the target object, by performing a gesture corresponding to a characteristic of the target object using a body part such as a fingertip that the user causes to appear to be superimposed on the target object, or performing a manipulation corresponding to the characteristic of the target object using a vector control means such as a remote control or a laser pointer.

Hereinafter, the operations of the object control management unit 220 according to one embodiment of the invention will be discussed in more detail below.

First, according to one embodiment of the invention, the object control management unit 220 may specify, in a real-world coordinate system, a control vector corresponding to a gesture performed by a user. Here, according to one embodiment of the invention, when the user performs a gesture such that a fingertip of the user appears to be superimposed on an object that the user desires to control, as seen from the viewpoint of the user, a control vector corresponding to the above gesture may be specified as a vector whose initial point is a position of an eye (more precisely, a dominant eye) of the user and whose terminal point is a position of the fingertip of the user.

Further, according to one embodiment of the invention, the object control management unit 220 may specify, in a real-world coordinate system, a control vector corresponding to a manipulation performed by the user. Here, according to one embodiment of the invention, when the user performs a manipulation of indicating an object that the user desires to control using a vector control means such as a remote control or a laser pointer, a control vector corresponding to the above manipulation may be specified on the basis of a posture of the vector control means with which the user performs the manipulation, or a direction of a control signal generated by the vector control means. For example, a control vector according to one embodiment of the invention may be a vector connecting two points on the vector control means which specify a posture of the vector control means; a vector corresponding to an axis defining a posture of the vector control means; a vector corresponding to a direction of an indication signal generated by the vector control means (e.g., a laser signal of the laser pointer, or an infrared (IR) signal of the remote control); or a vector connecting a point corresponding to a position of a signal generation unit for generating an indication signal in the vector control means and a predetermined reference point on the vector control means (which may be positioned on the opposite of the signal generation unit).

Next, according to one embodiment of the invention, the object control management unit 220 may determine an object indicated by a control vector specified in correspondence to a gesture or manipulation of a user in a target space as a target object to be controlled according to the gesture or manipulation of the user.

Specifically, the object control management unit 220 according to one embodiment of the invention may determine an object indicated by a control vector in a target space as a target object, with reference to spatial information on the user and the object. More specifically, the object control management unit 220 according to one embodiment of the invention may determine an object intersecting or neighboring a control vector or an extension thereof in a target space as a target object. That is, according to one embodiment of the invention, a target object need not necessarily intersect a control vector or an extension thereof, and even when an angle between a control vector and a reference vector from an initial point of the control vector to a reference point of an object (i.e., an error angle) is not greater than a predetermined level, the object may be determined as an object indicated by the control vector (i.e., a target object).

Next, according to one embodiment of the invention, the object control management unit 220 may perform mapping for specifying a control coordinate point corresponding to a magnitude or direction of the control vector in a target object reference coordinate system defined on the basis of a characteristic of the target object.

Next, according to one embodiment of the invention, the object control management unit 220 may determine a control command to be applied to the target object, with reference to the control coordinate point specified by the mapping.

FIGS. 4 to 7 illustratively show how to map a control vector in a real-world coordinate system to a control coordinate point in a target object reference coordinate system according to one embodiment of the invention.

Figure 4:
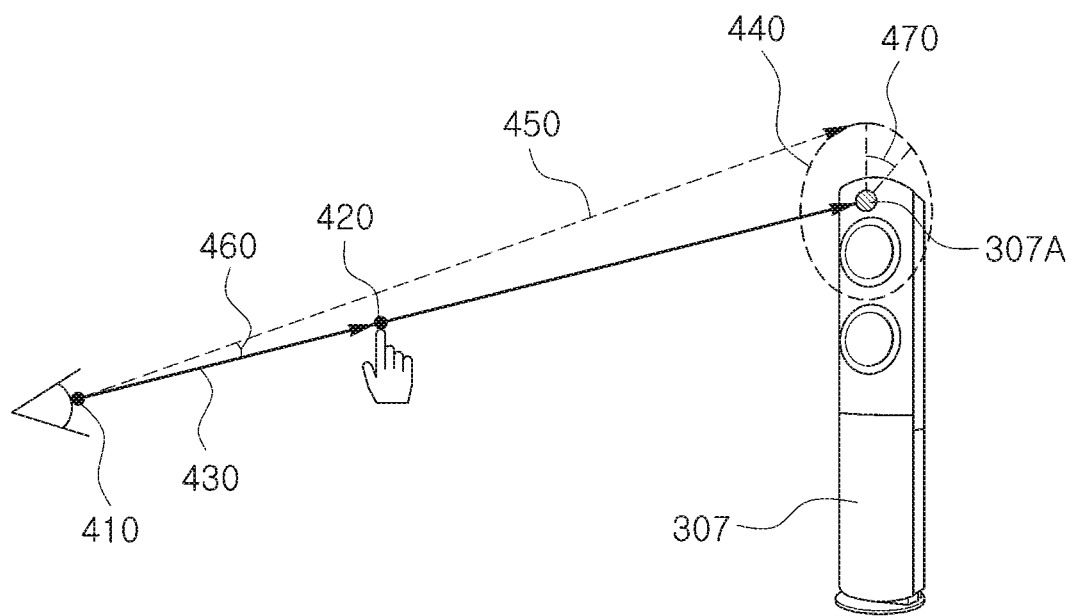
FIG. 4 illustratively shows how to map a control vector in a real-world coordinate system to a control coordinate point in a target object reference coordinate system according to one embodiment of the invention.

First, referring to FIG. 4, it may be assumed that an operation or function of the air conditioner 307 is controlled according to a gesture of a user. In this case, the object control management unit 220 according to one embodiment of the invention may determine the air conditioner 307, which is indicated by a control vector 430 (or an extension of the control vector 430) whose initial point is a position 410 of an eye (i.e., a dominant eye) of the user and whose terminal point is a position 420 of a fingertip of the user, as a target object to be controlled according to the gesture of the user. Here, according to one embodiment of the invention, even though the control vector 430 does not accurately indicate the reference point 307A of the air conditioner 307, the air conditioner 307 may be determined as the target object indicated by the control vector 430 when the control vector 430 is included in an error range (i.e., an error angle range) 460 allowed with respect to a reference vector (not shown) from the initial point 410 of the control vector 430 to the reference point 307A of the air conditioner 307.

Referring further to FIG. 4, the object control management unit 220 according to one embodiment of the invention may perform mapping for specifying a control coordinate point corresponding to a magnitude or direction of the control vector 430 in a zero-dimensional air conditioner reference coordinate system defined on the basis of a characteristic of the air conditioner 307 being the target object. For example, the control coordinate point may be specified by a magnitude of the control vector 430 and an angle of rotation 470 of the control vector 430 about the reference point 307A of the air conditioner 307.

Referring further to FIG. 4, the object control management unit 220 according to one embodiment of the invention may determine a control command to be applied to the air conditioner 307, with reference to the control coordinate point specified as above.

For example, when the control vector 430 is specified in the real-world coordinate system as the user performs a gesture of moving the fingertip 420 of the user in a direction toward the air conditioner 307 in a state in which the fingertip 420 corresponds to the reference point 307A of the air conditioner 307, the control vector 430 is mapped to a control coordinate point in the air conditioner reference coordinate system so that a magnitude value of the control coordinate point may be determined, and the air conditioner 307 may be turned on or off on the basis of the determined magnitude value of the control coordinate point.

As another example, when the control vector 430 is specified in the real-world coordinate system as the user performs a gesture of rotating the fingertip 420 of the user in a clockwise or counterclockwise direction about the reference point 307A of the air conditioner 307 as seen from the viewpoint of the user, the control vector 430 is mapped to a control coordinate point in the air conditioner reference coordinate system so that a rotation angle value of the control coordinate point may be determined, and a set temperature or wind speed of the air conditioner 307 may be adjusted on the basis of the determined rotation angle value of the control coordinate point.

As yet another example, when the control vector 430 is specified in the real-world coordinate system as the user performs a gesture of moving the fingertip 420 of the user in a rightward direction from the reference point 307A of the air conditioner 307 (i.e., a gesture of tapping an area on the right side of the air conditioner 307 (or "a right tap")) in a state in which the fingertip 420 corresponds to an area on the right side of the reference point 307A of the air conditioner 307 as seen from the viewpoint of the user (e.g., an area in which an error angle is 3 to 6 degrees and a rotation angle is 45 to 135 degrees), the control vector 430 is mapped to a control coordinate point in the air conditioner reference coordinate system so that a magnitude value and rotation angle value of the control coordinate point may be determined, and an air volume of the air conditioner 307 may be adjusted on the basis of the determined magnitude value and rotation angle value of the control coordinate point.

As still another example, when the control vector 430 is specified in the real-world coordinate system as the user performs a gesture of moving the fingertip 420 of the user from a lower area (e.g., an area in which an error angle is 3 to 6 degrees and a rotation angle is 135 to 225 degrees) to an upper area (e.g., an area in which an error angle is 3 to 6 degrees and a rotation angle is 315 to 45 degrees) with respect to the reference point 307A of the air conditioner 307 as seen from the viewpoint of the user (i.e., a gesture of swiping the air conditioner 307 from below to above), the control vector 430 is mapped to a control coordinate point in the air conditioner reference coordinate system so that a magnitude value and rotation angle value of the control coordinate point may be determined, and an air flow direction of the air conditioner 307 may be adjusted on the basis of the determined magnitude value and rotation angle value of the control coordinate point.

As still yet another example, when the control vector 430 is specified in the real-world coordinate system as the user performs a gesture of moving the fingertip 420 of the user from a right-side area (e.g., an area in which an error angle is 3 to 6 degrees and a rotation angle is 135 to 225 degrees) to a central area (e.g., an area in which an error angle is 0 to 3 degrees) with respect to the reference point 307A of the air conditioner 307 as seen from the viewpoint of the user (i.e., a gesture of tapping a right side of the air conditioner 307 (or "a right-side tap")), the control vector 430 is mapped to a control coordinate point in the air conditioner reference coordinate system so that a magnitude value and rotation angle value of the control coordinate point may be determined, and an operation mode of the air conditioner 307 may be adjusted on the basis of the determined magnitude value and rotation angle value of the control coordinate point.

Figure 5:
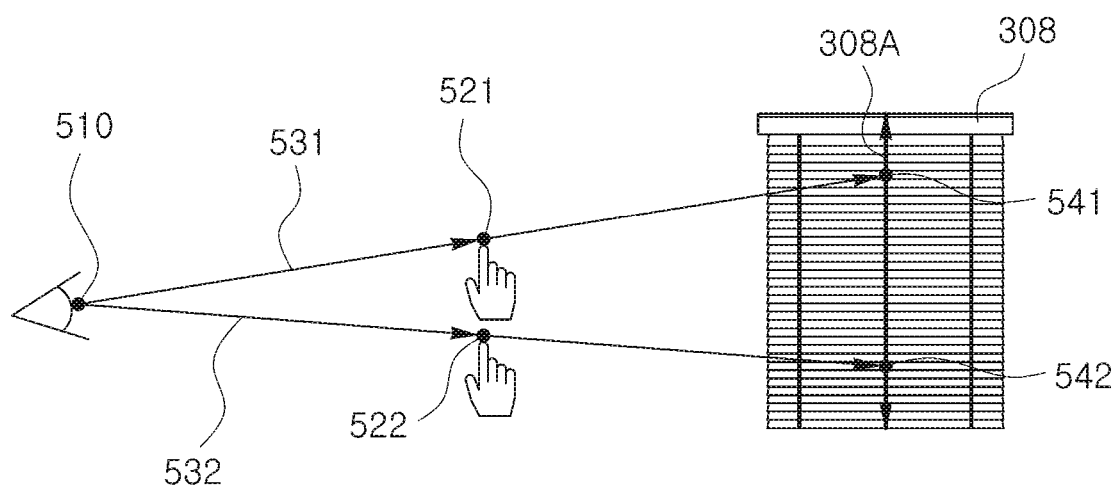
FIG. 5 illustratively shows how to map a control vector in a real-world coordinate system to a control coordinate point in a target object reference coordinate system according to one embodiment of the invention.

Next, referring to FIG. 5, it may be assumed that an operation or function of the blind 308 is controlled according to a gesture of a user. In this case, the object control management unit 220 according to one embodiment of the invention may determine the blind 308, which is indicated by a control vector 531, 532 (or an extension of the control vector 531, 532) whose initial point is a position 510 of an eye (i.e., a dominant eye) of the user and whose terminal point is a position 521, 522 of a fingertip of the user, as a target object to be controlled according to the gesture of the user. Here, according to one embodiment of the invention, even though the control vector 531, 532 does not accurately indicate the reference line 308A of the blind 308, the blind 308 may be determined as the target object indicated by the control vector 531, 532 when the control vector 531, 532 is included in an error range (i.e., an error angle range) allowed with respect to a reference vector (not shown) from the initial point 510 of the control vector 531, 532 to the reference line 308A of the blind 308.

Referring further to FIG. 5, the object control management unit 220 according to one embodiment of the invention may perform mapping for specifying a control coordinate point corresponding to a magnitude or direction of the control vector 531, 532 in a one-dimensional blind reference coordinate system defined on the basis of a characteristic of the blind 308 being the target object. For example, the control coordinate point may be specified by a magnitude of the control vector 531, 532 and one-dimensional coordinates of a point where the control vector 531, 532 meets or lies closest to the reference line 308A of the blind 308.

Referring further to FIG. 5, the object control management unit 220 according to one embodiment of the invention may determine a control command to be applied to the blind 308, with reference to the control coordinate points specified as above. For example, when a direction of the control vector 531, 532 is changed in the real-world coordinate system as the user performs a gesture of moving the fingertip 521, 522 of the user from a point 541 where the fingertip 521 appears to be located relatively higher in the reference line 308A of the blind 308 to a point 542 where the fingertip 522 appears to be located relatively lower in the reference line 308A of the blind 308, as seen from the viewpoint of the user, the control vector 531, 532 is mapped to a control coordinate point in the blind reference coordinate system so that one-dimensional coordinates of the control coordinate point may be changed, and an operation or function of drawing up or pulling down the blind 308 may be performed on the basis of the changed one-dimensional coordinates.

Figure 6:
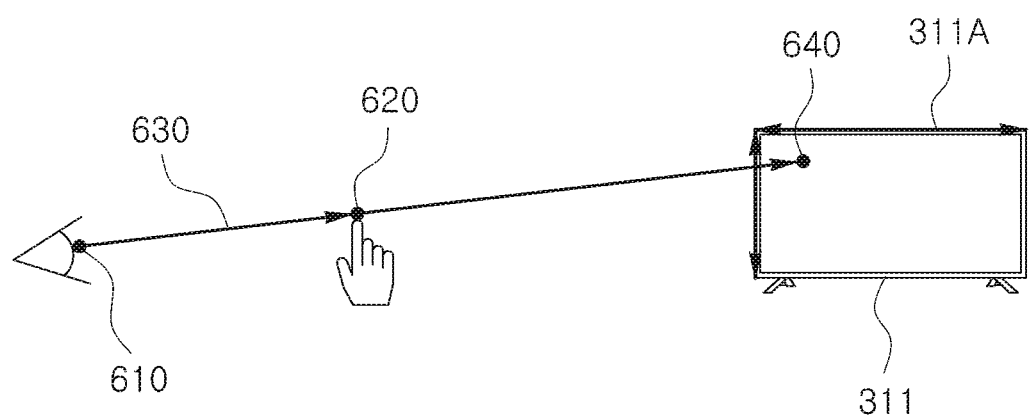
FIG. 6 illustratively shows how to map a control vector in a real-world coordinate system to a control coordinate point in a target object reference coordinate system according to one embodiment of the invention.

Next, referring to FIG. 6, it may be assumed that an operation or function of the television 311 is controlled according to a gesture of a user. In this case, the object control management unit 220 according to one embodiment of the invention may determine the television 311, which is indicated by a control vector 630 (or an extension of the control vector 630) whose initial point is a position 610 of an eye (i.e., a dominant eye) of the user and whose terminal point is a position 620 of a fingertip of the user, as a target object to be controlled according to the gesture of the user. Here, according to one embodiment of the invention, even though the control vector 630 does not accurately indicate the reference area 311A of the television 311, the television 311 may be determined as the target object indicated by the control vector 630 when the control vector 630 is included in an error range (i.e., an error angle range) allowed with respect to a reference vector (not shown) from the initial point 610 of the control vector 630 to the reference area 311A of the television 311.

Referring further to FIG. 6, the object control management unit 220 according to one embodiment of the invention may perform mapping for specifying a control coordinate point corresponding to a magnitude or direction of the control vector 630 in a two-dimensional television reference coordinate system defined on the basis of a characteristic of the television 311 being the target object. For example, the control coordinate point may be specified by a magnitude of the control vector 630 and two-dimensional coordinates of a point where the control vector 630 meets or lies closest to the reference area 311A of the television 311.

Referring further to FIG. 6, the object control management unit 220 according to one embodiment of the invention may determine a control command to be applied to the television 311, with reference to the control coordinate point specified as above. For example, when a direction of the control vector 630 is specified in the real-world coordinate system as the user performs a gesture to cause the fingertip 620 of the user to correspond to a certain point 640 near an upper left corner of the reference area 311A of the television 311 as seen from the viewpoint of the user, the control vector 630 is mapped to a control coordinate point in the television reference coordinate system so that two-dimensional coordinates of the control coordinate point may be specified, and an operation or function of selecting a graphical element, which is displayed on pixels corresponding to the specified two-dimensional coordinates in a display screen of the television 311, may be performed on the basis of the specified two-dimensional coordinates.

Figure 7:
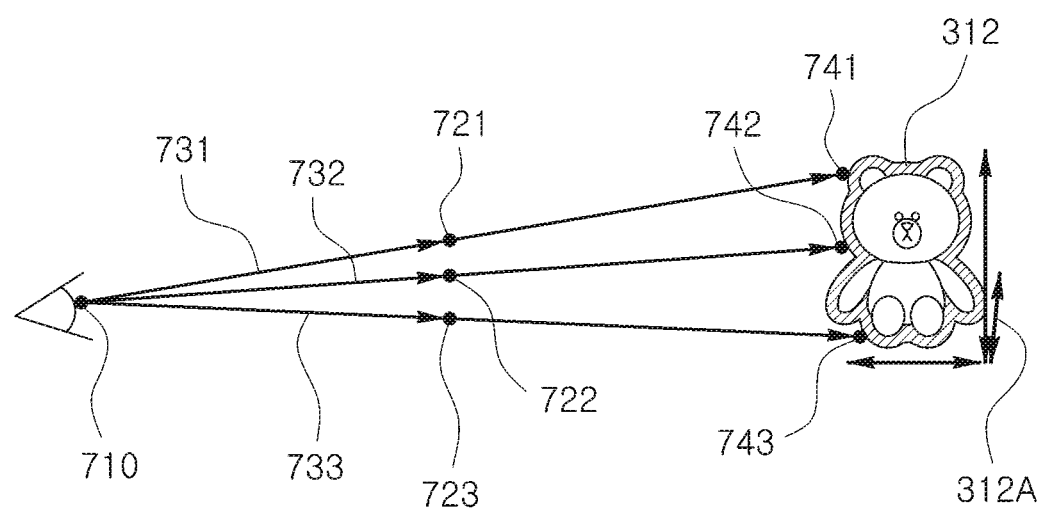
FIG. 7 shows how to map a control vector in a real-world coordinate system to a control coordinate point in a target object reference coordinate system according to one embodiment of the invention.

Next, referring to FIG. 7, it may be assumed that an operation or function of an augmented reality object (i.e., a virtual object) 312 for a doll is controlled according to a gesture of a user. Here, it is noted that visual information on the augmented reality object 312 may be provided to the user via a device such as a smart phone, a tablet, smart glasses, and a projector. In this case, the object control management unit 220 according to one embodiment of the invention may determine the augmented reality object 312, which is indicated by a control vector 731, 732, 733 (or an extension of the control vector 731, 732, 733) whose initial point is a position 710 of an eye (i.e., a dominant eye) of the user and whose terminal point is a position 721, 722, 723 of a fingertip of the user, as a target object to be controlled according to the gesture of the user. Here, according to one embodiment of the invention, even though the control vector 731, 732, 733 does not accurately indicate the reference space 312A of the augmented reality object 312, the augmented reality object 312 may be determined as the target object indicated by the control vector 731, 732, 733 when the control vector 731, 732, 733 is included in an error range (i.e., an error angle range) allowed with respect to a reference vector (not shown) from the initial point 710 of the control vector 731, 732, 733 to the reference space 312A of the augmented reality object 312.

Referring further to FIG. 7, the object control management unit 220 according to one embodiment of the invention may perform mapping for specifying a control coordinate point corresponding to a magnitude or direction of the control vector 731, 732, 733 in a three-dimensional augmented reality object reference coordinate system defined on the basis of a characteristic of the augmented reality object 312 being the target object. For example, the control coordinate point may be specified by a magnitude of the control vector 731, 732, 733 and three-dimensional coordinates of a point where the control vector 731, 732, 733 meets or lies closest to the reference space 312A of the augmented reality object 312.

Referring further to FIG. 7, the object control management unit 220 according to one embodiment of the invention may determine a control command to be applied to the augmented reality object 312 for the doll, with reference to the control coordinate point specified as above. For example, when a direction of the control vector 731, 732, 733 is specified in the real-world coordinate system as the user performs a gesture such that the fingertip 721, 722, 723 of the user appears to correspond to an ear part 741, a face part 742, or a foot part 743 of the augmented reality object 312 in the reference space 312A of the augmented reality object 312 as seen from the viewpoint of the user, the control vector 731, 732, 733 is mapped to a control coordinate point in the augmented reality object reference coordinate system so that three-dimensional coordinates of the control coordinate point may be specified, and an operation or function of selecting the ear part 741, face part 742, or foot part 743 of the augmented reality object 312 may be performed on the basis of the specified three-dimensional coordinates.

It is noted that although the embodiments in which an object is controlled on the basis of a gesture performed by a user have been mainly described in connection with FIGS. 4 to 7, the present invention is not necessarily limited to the embodiments illustrated in FIGS. 4 to 7 and may be changed without limitation as long as the objects of the invention may be achieved.

As another example, the embodiments may also be feasible in which a control vector corresponding to a manipulation that a user performs using a vector control means (e.g., a remote control or a laser pointer) is specified; a target object indicated by the specified control vector is determined; mapping for specifying a control coordinate point corresponding to the control vector in a reference coordinate system of the determined target object is performed; and a control command to be applied to the target object is determined with reference to the specified control coordinate point.

Figure 8:
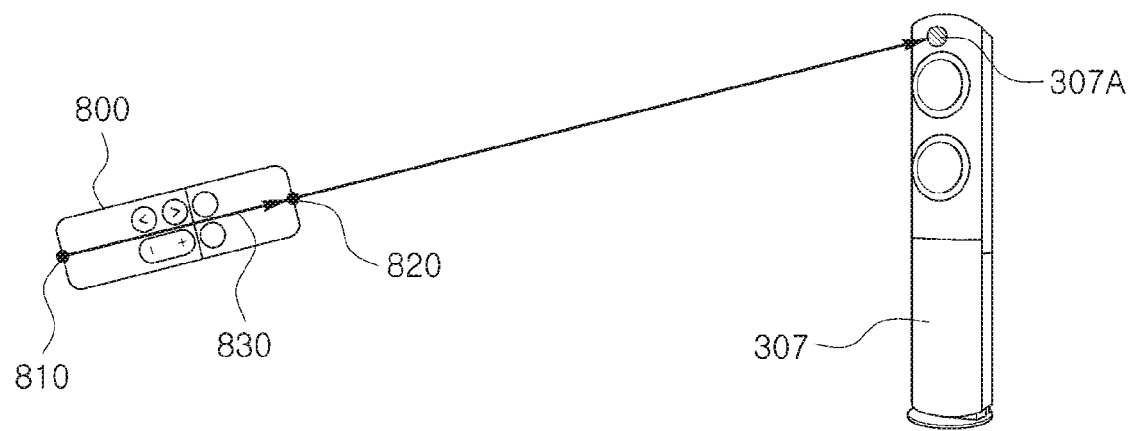
FIG. 8 illustratively shows how a control vector is specified according to a manipulation that a user performs using a vector control means according to one embodiment of the invention.
Figure 9:
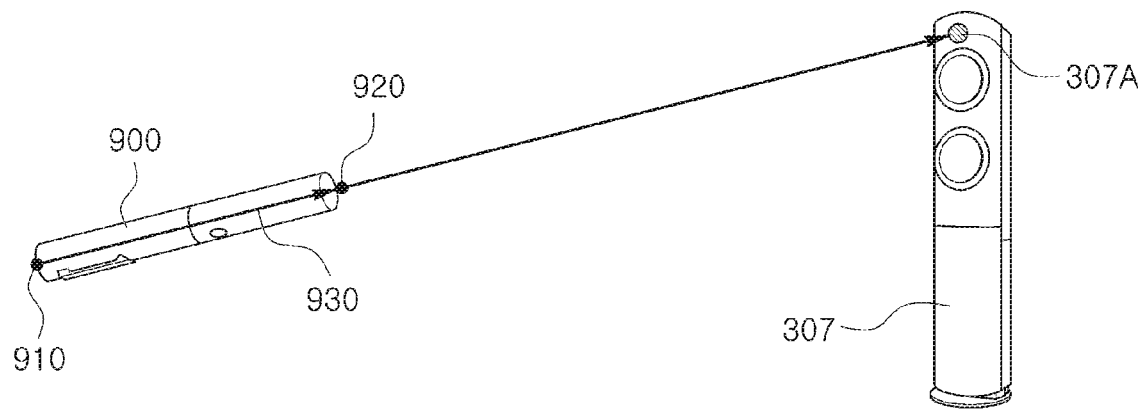
FIG. 9 illustratively shows how a control vector is specified according to a manipulation that a user performs using a vector control means according to one embodiment of the invention.

FIGS. 8 and 9 illustratively show how a control vector is specified according to a manipulation that a user performs using a vector control means according to one embodiment of the invention.

Referring to FIGS. 8 and 9, a control vector 830, 930 may be specified as a vector connecting a point 820, 920 corresponding to a position of a signal generation unit for generating a control signal in a vector control means 800, 900 (e.g., an infrared signal of a remote control 800 or a laser signal of a laser pointer 900) and a predetermined reference point 810, 910 positioned on the opposite of the signal generation unit in the vector control means 800, 900.

Referring further to FIGS. 8 and 9, the air conditioner 307, which is the object indicated by the specified control vector 830, 930 or an extension 840, 940 of the control vector, may be determined as a target object to be controlled according to the manipulation of the user Meanwhile, according to one embodiment of the invention, the database 230 may store a variety of spatial information on a user and objects existing in a space in which object control according to the invention is performed, and a variety of information on control vectors, control coordinate points, and control commands derived in performing the object control. Although FIG. 2 shows that the database 230 is incorporated in the object control assistance system 200, the database 230 may be configured separately from the object control assistance system 200 as needed by those skilled in the art to implement the invention. Meanwhile, the database 230 according to the invention encompasses a computer-readable recording medium, and may refer not only to a database in a narrow sense but also to a database in a broad sense including file system-based data records and the like. The database 230 according to the invention may be even a collection of simple logs if one can search and retrieve data from the collection.

Meanwhile, the communication unit 240 according to one embodiment of the invention may function to enable the object control assistance system 200 to communicate with an external device.

Lastly, the control unit 250 according to one embodiment of the invention may function to control data flow among the spatial information management unit 210, the object control management unit 220, the database 230, and the communication unit 240. That is, the control unit 250 may control inbound data flow or data flow among the respective components of the object control assistance system 200, such that the spatial information management unit 210, the object control management unit 220, the database 230, and the communication unit 240 may carry out their particular functions, respectively.

The embodiments according to the invention as described above may be implemented in the form of program instructions that can be executed by various computer components, and may be stored on a non-transitory computer-readable recording medium. The non-transitory computer-readable recording medium may include program instructions, data files, data structures and the like, separately or in combination. The program instructions stored on the non-transitory computer-readable recording medium may be specially designed and configured for the present invention, or may also be known and available to those skilled in the computer software field. Examples of the non-transitory computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be configured to operate as one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method implemented in a system for assisting object control, the system comprising an object control management unit, and the method comprising the steps of:
- by the object control management unit, specifying, in a real-world coordinate system, a control vector corresponding to a gesture or manipulation performed by a user;
- by the object control management unit, determining an object indicated by the control vector as a target object to be controlled by the gesture or manipulation performed by the user;
- by the object control management unit, performing mapping for specifying a control coordinate point corresponding to a magnitude or direction of the control vector in a target object reference coordinate system; and
- by the object control management unit, determining a control command to be applied to the target object, with reference to the control coordinate point specified by the mapping,
- wherein the target object reference coordinate system is defined on the basis of a characteristic associated with a gesture or manipulation applicable to the target object, and a reference point, a reference line, a reference area, or a reference space established according to a characteristic with respect to the target object, and
- wherein the control coordinate point is specified on the basis of a relationship between the control vector and the reference point, the reference line, the reference area, or the reference space.

2. The method of claim 1, wherein the control vector is a vector whose initial point is a position of an eye of the user and whose terminal point is a position of another body part of the user.

3. The method of claim 1, wherein the control vector is a vector specified on the basis of a posture of a vector control means with which the manipulation is performed, or a direction of a control signal generated by the vector control means.

4. The method of claim 1, wherein the object is a real object or a virtual object existing around the user.

5. The method of claim 1, wherein, in the step of determining the target object, an object that intersects or lies closest to the control vector or an extension of the control vector in the real-world coordinate system is determined as the target object, with reference to spatial information on the user and the object.

6. A non-transitory computer-readable recording medium having stored thereon a computer program for executing the method of claim 1.

7. A system for assisting object control, comprising:
- an object control management unit configured to:
  - specify, in a real-world coordinate system, a control vector corresponding to a gesture or manipulation performed by a user,
  - determine an object indicated by the control vector as a target object to be controlled by the gesture or manipulation performed by the user,
  - perform mapping for specifying a control coordinate point corresponding to a magnitude or direction of the control vector in a target object reference coordinate system, and
  - determine a control command to be applied to the target object, with reference to the control coordinate point specified by the mapping; and
- a spatial information management unit configured to store spatial information on the user and the object,
- wherein the target object reference coordinate system is defined on the basis of a characteristic associated with a gesture or manipulation applicable to the target object, and a reference point, a reference line, a reference area, or a reference space established according to a characteristic with respect to the target object, and
- wherein the control coordinate point is specified on the basis of a relationship between the control vector and the reference point, the reference line, the reference area, or the reference space.

* * * * *